UNITED STATES PATENT OFFICE.

MARK W. MARSDEN, OF PHILADELPHIA, PENNSYLVANIA, ASSIGNOR TO SUGAR CANE BY-PRODUCTS CO., OF PHILADELPHIA, PENNSYLVANIA, A CORPORATION OF DELAWARE.

METHOD OF TREATING BAGASSE AND PRODUCT THEREOF.

1,170,487.  Specification of Letters Patent.  Patented Feb. 1, 1916.

No Drawing.  Application filed March 10, 1914.  Serial No. 823,699.

*To all whom it may concern:*

Be it known that I, MARK WORSNOP MARSDEN, a citizen of the United States, residing at Philadelphia, in the county of Philadelphia and State of Pennsylvania, have invented certain new and useful Improvements in Methods of Treating Bagasse and Products Thereof, of which the following is a specification.

Sugar-cane from which bagasse is derived is a species of grass the stalks of which sometimes attain a height of fifteen feet or more with a diameter of one and a half to two inches. The stalks are divided into prominent joints or internodes and as these ripen the leaves wither and fall away and the stems become externally smooth and hard and contain much silica. An average sample of Tahiti cane, at maturity, contains water 71.04, sugar 18.00, ligneous tissue and cellular matter with pectin 9.56, albumen, coloring matter and insoluble salts 1.20, and silica 0.20. The average production is about twenty tons per acre.

Bagasse is the term applied to the cane in its crushed state after the expression of the sugar juices. It is employed principally as fuel and as a cattle food although it has been suggested and a number of attempts have been made to recover its fiber for the manufacture of paper and the like.

Bagasse is too valuable to be employed as a fuel and as a food for cattle especially since it serves these purposes rather indifferently than otherwise. One ton of bagasse when properly treated will yield 80 gallons of acetone oil, 350 pounds of fertilizer, and 400 pounds of fiber; or by another treatment 125 gallons of alcohol, 550 pounds of fertilizer, and 400 pounds of fiber. Unquestionably bagasse is possessed of a large store of fiber, but so far no method has been advanced for commercially, that is to say economically and otherwise successfully, treating it for the recovery of the same.

In trying out the methods heretofore suggested and in experimenting along other and original lines I have discovered that the failure was primarily due and predicated on the fact that the bagasse was treated either in its green, moist state, or after it had at least in part rotted. When it leaves the sugar refinery it is in a crushed damp mass, containing as it does 10 to 15 per cent. of moisture, about 1¼ to 3½ per cent. of sugar and saccharin, together with coloring matter and other soluble bodies, and being naturally in a warm climate the mass soon ferments and sours, generating the juice remainder into an acid, and when treated, as heretofore, for the recovery of the fiber the reagents will attack the fiber to such an extent as to render it commercially valueless. The desideratum, therefore, is to obviate this rotting or fermenting of the stock. Accordingly my invention consists in overcoming this difficulty, and in other steps, and in the product of the method, all as hereinafter described and finally claimed.

In practising the invention, the bagasse is first subjected to the action of dry heat to evaporate or otherwise dispel the moisture content. This may be accomplished, for example, in an oven or a heated revolving cylinder, or by any other suitable drier. This treatment is essentially slow and deliberate to avoid caramelizing and burning or charring. The duration of treatment will depend in a measure on the amount of moisture content, but at any rate the treatment is continued until the bagasse is thoroughly dehydrated, desiccated, or dried. It is then cut into uniform lengths of ¾ to 1½ inches, and may thereupon be treated for the recovery of its fiber or baled for shipment or storage and future treatment.

In proceeding for the recovery of the fiber, the stock having been prepared as above described is hydrolyzed or washed with water in order to remove or dissolve the soluble matters. This action may be accelerated by the application of heat and to a greater extent by the application of steam at a pressure of from ten to twenty-five pounds, more or less; and this treatment with heat, moisture and pressure is maintained for a period ranging from two to five hours or until all of the soluble matters are in solution. The fluid is then drawn off and expressed from the stock and treated in any suitable way for the recovery of the valuable extractive. In order to insure the thorough removal of the extractive or soluble elements further washing may be resorted to. In this state, that is to say, deprived of all the extractive matter the stock is ready for the next step or reduction treatment to dissolve the lignin or incrusting matter and to free the fibers from each other. This may be accomplished by treating the stock in a suitable digester with a dilute alkali or sulfid solution. The purpose of this treatment is to separate and recover the fiber in its natural strength and of sufficient length to readily mat when subjected to the usual and well-known methods of treatment for the production of paper. I find that the best results are obtained by continuing this treatment from two to five hours under a steam pressure of thirty to sixty pounds, more or less. When this treatment has served its purpose, that is to say, when the fiber is freed of silica and incrusting matter and disintegrated so to speak, the stock is removed from the bath which may then or subsequently be treated in any well known manner for the recovery of the chemicals which may be used over again thus effecting a further economy. The stock or pulp is then washed to eliminate all trace of the bath, whereupon it is ready for the beating engine, and subsequently for bleaching or coloring and such other treatments as are incident to the art of making paper or paper board, and the like.

The product of this method is characterized by its clean, long, strong and flexible fiber, which will not deteriorate with age or ordinary use and will make an excellent quality of newspaper. I have also obtained good results by combining this fiber with the fiber or fibers of other materials and my invention includes this step as well as the product thereof.

Having described the nature and object of the invention what I claim as new and desire to secure by Letters Patent is:—

1. That improvement in the treatment of bagasse for the recovery of its industrial values, which consists in subjecting it to dry distillation before digesting.

2. That improvement in the treatment of bagasse for the recovery of its industrial values, which consists in removing the natural moisture content by evaporating it to dryness.

3. That improvement in the treatment of bagasse for the recovery of its industrial values, which consists in subjecting it to the action of dry heat at a regulated temperature to evaporate its natural moisture content.

4. The herein-described method of treating bagasse, which consists in dehydrating it, dissolving and removing the extractive, and reducing the stock to useful fiber.

5. The herein-described method of treating bagasse, which consists in thoroughly drying it to prevent fermentation and decay, dissolving and recovering the extractive, and reducing the stock to useful fiber.

6. The herein-described method of treating bagasse, which consists in drying it by the application of heat at a temperature sufficient to evaporate the natural moisture content, subjecting the dried stock in pieces of substantially uniform length to suitable treatment to eliminate the extractive, and thereafter subjecting it to suitable treatment for the recovery of the fiber in its natural strength.

7. The herein-described method of treating bagasse, which consists in drying it by the application of heat at a temperature sufficient to evaporate the natural moisture content, and subjecting the dried stock to suitable treatment for the manufacture of paper.

8. The herein-described method of treating bagasse, which consists in subjecting the stock to dry distillation, subjecting the dried bagasse in regulated lengths to suitable treatment with heat, moisture and pressure to dissolve the extractive, washing the stock to remove all evidence of the extractive, and thereafter subjecting it to the action of reagents in the presence of heat, moisture and pressure to eliminate the incrusting matter and silica and recover the fiber in useful form.

9. Paper consisting of the product of bagasse or sugar cane initially evaporated to dryness and then treated with reagents to remove the extractive, incrusting matter and silica.

In testimony whereof I affix my signature in presence of two witnesses.

MARK W. MARSDEN.

Witnesses:
 FRANK SALASIN,
 E. W. STRAIN.

Copies of this patent may be obtained for five cents each, by addressing the "Commissioner of Patents, Washington, D. C."